United States Patent
Jensen et al.

(10) Patent No.: US 11,123,700 B2
(45) Date of Patent: Sep. 21, 2021

(54) METHOD OF MONITORING A SPRAY DRYER AND A SPRAY DRYER COMPRISING ONE OR MORE INFRARED CAMERAS

(75) Inventors: Thomas Willum Jensen, Værløse (DK); Johnny Bonke, Roskilde (DK)

(73) Assignee: GEA Process Engineering A/S, Soborg (DK)

(*) Notice: Subject to any disclaimer, the term of this patent is extended or adjusted under 35 U.S.C. 154(b) by 287 days.

(21) Appl. No.: 13/511,557

(22) PCT Filed: Nov. 24, 2009

(86) PCT No.: PCT/DK2009/050312
§ 371 (c)(1),
(2), (4) Date: Aug. 1, 2012

(87) PCT Pub. No.: WO2011/063808
PCT Pub. Date: Jun. 3, 2011

(65) Prior Publication Data
US 2012/0287285 A1    Nov. 15, 2012

(51) Int. Cl.
*B01J 2/04* (2006.01)
*B01J 2/16* (2006.01)
*F26B 3/12* (2006.01)
*G01N 21/85* (2006.01)
*B05B 12/08* (2006.01)
*F26B 25/00* (2006.01)

(52) U.S. Cl.
CPC .............. *B01J 2/04* (2013.01); *B01J 2/16* (2013.01); *B05B 12/082* (2013.01); *F26B 3/12* (2013.01); *F26B 25/009* (2013.01); *G01N 21/85* (2013.01); *G01N 2021/8564* (2013.01)

(58) Field of Classification Search
None
See application file for complete search history.

(56) References Cited

U.S. PATENT DOCUMENTS

| | | | |
|---|---|---|---|
| 3,343,823 A | 9/1967 | Schmeister et al. | |
| 4,301,998 A | 11/1981 | Rodway | |
| 4,843,561 A * | 6/1989 | Larson | A01D 46/24 209/587 |
| 4,875,845 A | 10/1989 | Hara et al. | |

(Continued)

FOREIGN PATENT DOCUMENTS

| CA | 2292712 A1 | 7/2000 |
|---|---|---|
| DE | 199 00 247 A1 | 7/2000 |

(Continued)

OTHER PUBLICATIONS

Mujumdar A., "Handbook of Industrial Drying" Second Edition, vol. 1, Montreal, 1995.*

(Continued)

*Primary Examiner* — Stefan Gadomski
(74) *Attorney, Agent, or Firm* — Sughrue Mion, PLLC

(57) ABSTRACT

The spray dryer comprises a spray drying chamber having a substantially cylindrical top section, a conical wall and a narrowed lower section. In the top section, atomizing means is provided. One or more cameras are associated with the drying chamber in order to monitor the process. At least one of the cameras is an infrared camera adapted for measuring the temperature within a predefined area.

19 Claims, 3 Drawing Sheets

(56) References Cited

U.S. PATENT DOCUMENTS

Figure 1:
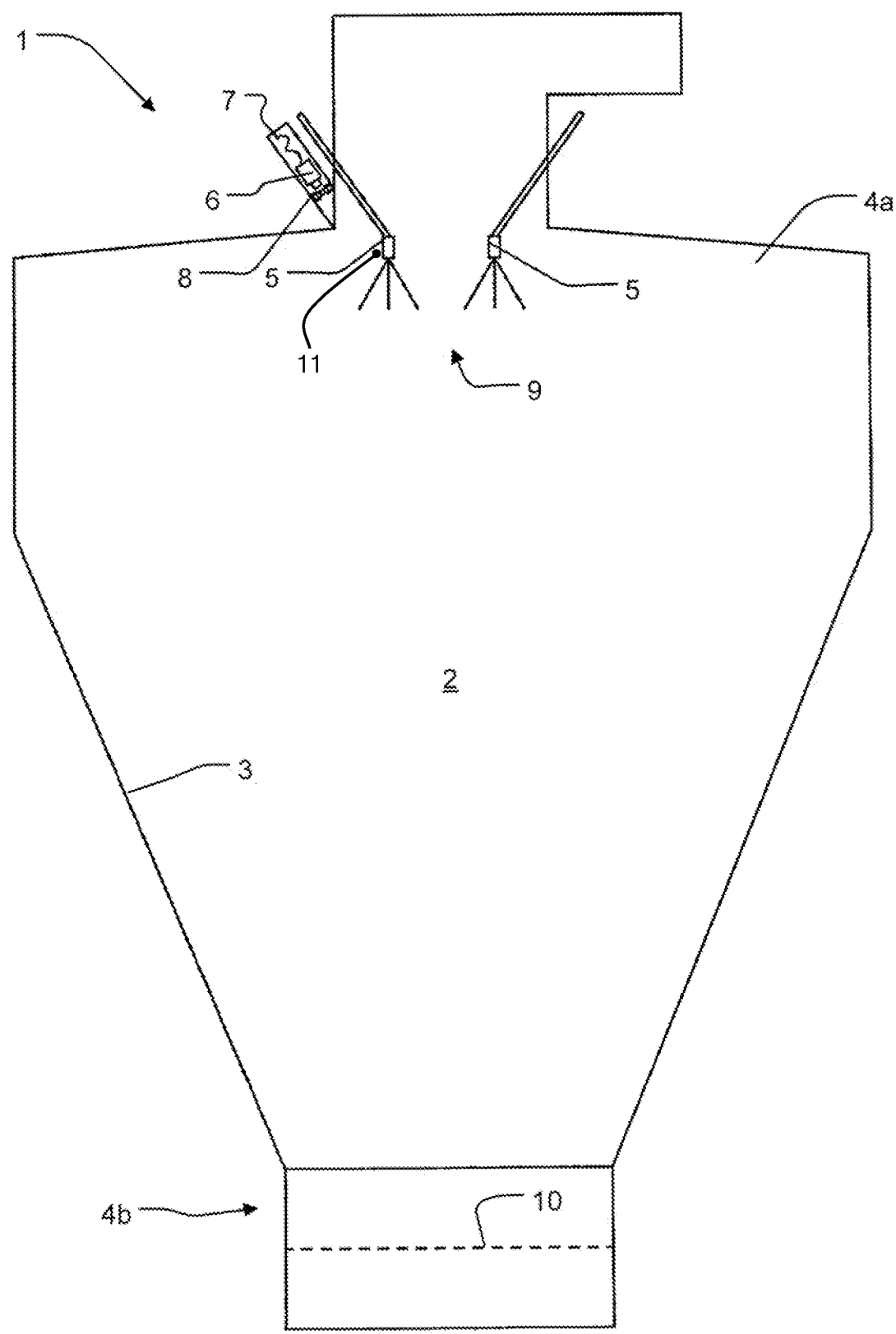

| | | | | |
|---|---|---|---|---|
| 5,100,111 | A * | 3/1992 | Thomas | G01N 25/04 266/100 |
| 5,207,176 | A * | 5/1993 | Morhard | F23G 5/006 110/101 CC |
| 5,745,969 | A * | 5/1998 | Yamada | C10B 29/06 264/30 |
| 5,839,207 | A * | 11/1998 | Christensen | F26B 3/082 34/369 |
| 6,100,922 | A * | 8/2000 | Honda | G01N 21/88 348/86 |
| 6,229,563 | B1 * | 5/2001 | Miller, II | F27D 21/02 348/82 |
| 6,690,016 | B1 * | 2/2004 | Watkins | G01N 25/72 250/341.1 |
| 6,841,005 | B2 * | 1/2005 | Schutte | C23C 4/12 118/665 |
| 2002/0153627 | A1 * | 10/2002 | Ray | B22F 1/025 264/13 |
| 2004/0225452 | A1 * | 11/2004 | Campbell | F26B 3/08 702/22 |
| 2005/0045751 | A1 * | 3/2005 | Nance | B05B 15/061 239/587.1 |
| 2008/0166489 | A1 * | 7/2008 | Strock | C23C 4/02 427/421.1 |
| 2009/0224065 | A1 * | 9/2009 | Mirko | F26B 3/12 239/8 |
| 2012/0057018 | A1 * | 3/2012 | Arp | H04N 5/33 348/86 |

FOREIGN PATENT DOCUMENTS

| | | |
|---|---|---|
| EP | 0307482 B1 | 2/1994 |
| EP | 1752553 A2 | 2/2007 |
| JP | 2001057642 A * | 2/2001 |
| WO | 9118146 A1 | 11/1991 |
| WO | 2010132634 A1 | 11/2010 |

OTHER PUBLICATIONS

Tetra Pak, "Dairy processing handbook", Sweden: Tetra Pak 2003 ISBN 91-631-3427-6.*

Milk and whey powder, Tetra Pak Processing Systems AB, Dairy Processing Handbook, Chapter 17, 16 pages total, ISBN 91-631-3427-6.

Constructional drawing.

Affidavit, in the matter of European Patent Application No. 09764146.5, 2 pages total.

* cited by examiner

METHOD OF MONITORING A SPRAY DRYER AND A SPRAY DRYER COMPRISING ONE OR MORE INFRARED CAMERAS

CROSS REFERENCE TO RELATED APPLICATIONS

This application is a National Stage of International Application No. PCT/DK2009/050312 filed Nov. 24, 2009, the contents of all of which are incorporated herein by reference in their entirety.

FIELD OF THE INVENTION

The present invention relates to a method of monitoring a spray dryer comprising the steps of: providing a spray drying chamber, and associating one or more cameras with the spray drying chamber, said one or more camera having a field of view inside the spray drying chamber. Furthermore, the invention relates to a spray dryer comprising a spray drying chamber, atomizing means, and one or more cameras positioned in connection with the spray drying chamber.

BACKGROUND OF THE INVENTION

Spray drying is a well-known process for turning a liquid product into a powder product. The drying takes place in a drying chamber, in which the drying air is brought into contact with the feed, i.e. the liquid being atomized into droplets, by one or more nozzles or other forms of atomizer, such as a rotary atomizer. The drying air enters the drying chamber via an air disperser positioned at or near the top of the drying chamber. Further drying means may be provided in such drying system, for instance a fluidized bed.

In particular when atomizing the liquid into droplets to be dried by the use of nozzles, e.g. pressure nozzles or two-fluid nozzles, it is important that the nozzles do spray as intended, as otherwise a non-uniform drying process will be performed resulting in for example formation of deposits on the nozzle itself and on the wall inside of the drying chamber, and in the production of a product of less quality and a reduced capacity. As a consequence, lumps may occur in the product, and also, the risk of formation of deposits may lead to an exaggerated heating and in worst case fire in this deposit, as being in a heated zone for a longer time than anticipated. It is desirable to ensure that leaks in nozzles in spray dryers that can disrupt the droplet dispersal within the chamber are detected, and to reduce the build-up of solid matter that can make the chamber overheat and, in extreme cases, may even cause fire and an explosion. Traditionally, fire or explosion detection and extinguishing or relieving devices are nevertheless provided in such spray dryers.

Monitoring and surveillance of various processes are known in the art. This monitoring is traditionally carried out in order to ascertain correct operational temperatures of for instance the output of an outlet such as a nozzle, or to ensure that the item to be sprayed has the correct temperature. However, monitoring of a spray drying process has a different objective as explained in the above. Monitoring of the temperature of the dried product is carried out in the relevant portion of the spray dryer, i.e. in the central or lower portion of the drying chamber.

As the product produced must be according to specifications as to quality and particle size, and as sources for starting fires and/or dust explosions in spray drying systems must be eliminated as far as possible for obvious reasons, the spraying process must be monitored. Some years ago, the Applicant developed a revolutionary system to monitor the performance of spray nozzles system in its dryers, using visual TV cameras. The cameras show a continuous picture of the spray zone allowing operators to ensure that there are no leaks or any build-up of solid matter and that the spray pattern within the drying chamber remains at an optimum level. Furthermore, it is possible with the cameras to monitor if the high pressure-shut off valves are leaking. This helps in avoiding unnecessary shut downs, improves product quality and reduces the risk of heat build-up within the chamber. In the past this was impossible to do while the spray dryer was running as the spray nozzles are fully enclosed in the drying chamber. The use of cameras, however, allows operators to watch the mist emerging from the nozzles and identify any abnormalities immediately. They can then intervene if necessary to take corrective action but only when needed. Unnecessary shut downs are eliminated. The TV camera monitoring system is particularly useful for detecting leaks from nozzles gaskets during production and from the nozzle itself during the start up and shut down of the spray drying equipment. By watching the way the nozzle behaves during every stage of the process fouling of the drying chamber can be minimized and support the avoidance of safety issues such as fire and explosions. The camera also allows operators to monitor the fines in the spray zone to ensure the best possible product quality. As a further development of the technology, automatic monitoring of the camera image may be tailor-made for each specific spray dryer.

Hence, built-in traditional visual TV cameras are used to give the operator an actual picture of the nozzle spraying performance. This means that an operator must watch a monitor all the time during processing or that an automatic picture analysing software systems must be applied to surveillance such process. As many spray drying plants are running 24 hours a day for periods, a manual monitoring all the time is time consuming in terms of man-power. This is a disadvantage.

The alternative of applying automatic picture analysing systems is also disadvantageous as such need adaption to every specific spray dryer, and as the costs of software is substantial.

SUMMARY OF THE INVENTION

With this background it is an object of the invention to provide monitoring of a spray dryer, by which these disadvantages are over-come.

In a first aspect of the present invention, this and further objects are met by a method of monitoring a spray dryer comprising the steps of: providing a spray drying chamber, and associating one or more cameras with the spray drying chamber, said one or more camera having a field of view inside the spray drying chamber, whereby at least one of said one or more cameras is an infrared camera, and whereby the temperature is measured within a predefined area.

In this manner, by using infrared cameras, a precise temperature measurement within a predefined area is made possible. Thus, the temperature may be measured in an area of choice, which may for instance be chosen by the operator or according to a predefined surveillance pattern. It has surprisingly been found that an infrared camera for surveillance in a spray dryer may work without side effects or errors even if the hot drying gas in the spray dryer is supplied between the camera and the object to observe.

There may be several infrared cameras in one spray dryer, depending, i.a., on the number of atomizing nozzles. If having just one nozzle, one infrared camera may be sufficient. If for instance using eight atomizing nozzles, two or three infrared cameras may be optimal to fully cover all nozzles. In one advantageous embodiment, at least two infrared cameras are associated with said spray drying chamber.

In order to cover as large an area as possible with a single infrared camera, each infrared camera may have a field of view of at least 90 degrees. A so-called fish eye lens covering virtually 180 degrees may be beneficially used to cover a wide area, as some minor picture deformation is of no importance for the control function based on temperature.

The method may be utilized for measuring temperatures at arbitrary positions in the spray dryer. However, certain parts of the drying chamber are more subjected to the formation of deposits and high temperatures. In the case that the method comprises the further step of providing at least one spray nozzle as atomizing means, the predefined area monitored by the at least one infrared camera advantageously comprises a part of the spray nozzle or spray nozzles, or the spray nozzle or spray nozzles.

Alternatively or additionally, the predefined area monitored by the at least one infrared camera comprises a part of a wall of the spray drying chamber.

Furthermore, the predefined area monitored by the at least one infrared camera may comprise a part of a fluid bed gas distributor plate in the lower part of the spray drying chamber.

Preferably, the method comprises the further steps of providing a control system, and providing a set value for the temperature in said predefined area, wherein the control system is associated to an alarm triggered when the temperature exceeds said set value. This, in turn, makes it possible to obtain automatic surveillance of a spray drying process. The control system may for instance be monitored from a distance. An advantage of this method is the attainment of improved safety, as conventional fire or smoke detection means, for instance a so-called CO monitoring within a drying chamber, may not be sufficient to tell a starting glowing which may result in a fire. The infrared surveillance may discover this at an earlier stage. By this method, it is possible to trigger the alarm when the temperature within the predefined area exceeds a certain value, i.e. locally at specific points of the spray dryer, whereas conventional CO monitoring is only triggered when a fire is started, that is, at a much later stage.

The monitoring may thus be carried out with respect to deposits of solid material, and the set value for the temperature is the temperature of the deposits. The operation of the spray dryer may be stopped when the alarm is triggered. When the spray dryer is at a stand-still, the deposits may be removed. All in all, this prevents excessive heating and the break-out of fire. Following the removal of the deposits and possibly further cleaning procedures, the operation of the spray dryer may be re-started.

In order to prevent excessive heating of the infrared camera itself, a cooling gas may supplied to cool the at least one infrared camera.

Although the infrared camera or infrared cameras may in principle be positioned outside the spray drying chamber, as long as the field of view is located within the drying chamber, the infrared camera or infrared cameras may advantageously be positioned in the spray drying chamber via a movable and/or removable camera lance. This makes it possible to provide the necessary wiring and electronics in the lance itself.

In case a normal visual image of the spray drying process is desired, it is possible to combine an ordinary visual camera with an infrared camera in one camera lance. The visual camera and the infrared camera may be separate or integrated into a single unit.

In another aspect of the invention a spray dryer comprising a spray drying chamber, atomizing means, and one or more cameras positioned in the spray drying chamber is provided, said spray dryer being characterized in that at least one of said one or more cameras is an infrared camera.

When using infrared cameras, a precise temperature measurement within a predefined area is made possible. Thus, the temperature may be measured in an area of choice, which may for instance be chosen by the operator or according to a predefined surveillance pattern. It has surprisingly been found that an infrared camera for surveillance in a spray dryer may work without side effects or errors even if the hot drying gas in the spray dryer is supplied between the camera and the object to observe.

The infrared camera or infrared cameras may be positioned in the spray drying chamber via a movable and removable camera lance. This makes it possible to provide the necessary wiring and electronics in the lance itself, as well as providing for easy moving, removal and replacement of the camera.

In case a normal visual image of the spray drying process is desired, it is possible to combine an ordinary visual camera with an infrared camera in one camera lance. The visual camera and the infrared camera may be separate or integrated into a single unit.

The at least one infrared camera may be covered by means of an inspection glass and a protective grid.

Each specific embodiment and variation of features applies equally to each aspect of the invention unless specifically stated otherwise. Further details and advantages will appear from the dependent claims and from the following description.

BRIEF DESCRIPTION OF THE DRAWINGS

In the following, the invention will be described in further detail by means of the following description of preferred embodiments and with reference to the drawings, in which FIG. 1 shows a schematic side view of a spray dryer in one embodiment of the invention;

FIG. 2 shows a schematic side view of a spray dryer in another embodiment of the invention;

FIG. 3 shows a perspective view, on a larger scale, of a detail of the spray dryer shown in FIG. 2.

DETAILED DESCRIPTION OF THE INVENTION

FIG. 1 shows an embodiment of a spray dryer 1 having a spray drying chamber 2 comprising a substantially cylindrical top section 4*a*, a conical wall 3 and a narrowed lower section 4*b*. In the top section 4*a*, atomizing means 9 is provided. An air disperser connected to an air inlet, which may be a straight air inlet, or a radial inlet, or a tangential inlet, is provided in a top section of the spray drying chamber (not shown). The air disperser may for instance have the form described in Applicant's co-pending international application No. WO 2007/071238 or No. PCT/DK2009/050277, or may be designed as any other traditional air disperser as well.

The spray dryer 1 includes, in a manner known per se, feeding means leading to the atomizing means 9. The air disperser may for instance be mounted above or in the ceiling of the drying chamber 2 of the spray dryer 1, or in the top section 4a of the drying chamber 2. Depending on i.a. the size of the drying chamber 2, there may be more than one, e.g. three, such air dispersers mounted in the ceiling of the drying chamber 2.

Drying air entering the air disperser from the air inlet is directed into a downward flow of drying air into the drying chamber, where the drying air is brought into contact with the atomized material emanating from the atomizing means 9. In the embodiment shown, the atomizing means 9 are provided in the form of nozzles 5 directed downwards in the drying chamber 2. In alternative embodiments, the atomizing means 9 may be in the form of a rotary atomizer. As a further alternative, the atomizing means 9 may be provided as one or more nozzles supplied from a nozzle lance system. The nozzle lance may extend through the centre of the air disperser, or outside the air disperser.

In the embodiment shown, the spray dryer 1 furthermore comprises an infrared camera (IR camera) 6 positioned in connection with the drying chamber 2. The IR camera 6 is mounted outside the drying chamber 2 in a camera lance 7. The lance 7 including the camera 6 may also be positioned inside the drying chamber 2. In order to protect the IR camera 6 from the material being spray dried a protective glass 8 is provided. The nozzles 5 are within the field of view of the IR camera 6. Each infrared camera should have a sufficient field of view, which depends on the distance from the camera placement to the area to monitor. For instance a view of at least 15, 30 or 60 degrees, but for monitoring of the nozzles, a 90 degrees view could be preferable if the cameras are placed near to the nozzles. During spray drying, material leaving the nozzles 5 is swirled around in the spray drying chamber 2. Despite efforts to the contrary, deposits may settle on the nozzles 5, such as the non-limiting example deposits 11 shown on the outer surface of one of the nozzles 5, in particular if the material is sticky or viscous. The problem of deposits is particularly pronounced during start-up of the drying process, or in the case of defective nozzles. The temperature of the nozzles 5 may then rise locally, if the deposits are not removed. The deposits become more and more dry, entailing a rise of temperature until they either ignite spontaneously, fall into the drying chamber 2 or on to a fluid bed in the lower section 4, the material being then possibly ignited here. In the embodiment shown in FIG. 1, the IR camera 6 is used to monitor the nozzles 5. This is performed by selecting a predefined area to be monitored. The IR camera 6 is provided with means for allowing adjustment of the predefined area, both in terms of dimensions and position. The temperature is then measured within the predefined area. When a certain temperature level chosen as a set value within that particular predefined area has been detected by the IR camera 6 or related circuitry such as a computer, an alarm is triggered and it is possible to stop the drying and remove the deposits before and actual fire or explosion is set off.

The set value, i.e. temperature that is required to trigger the alarm, depends on the type of material handled in the spray dryer 1. The drying gas temperature for chemical or ceramic products is considerably higher than for dairy, pharmaceutical or food products. The operating temperature of the nozzles 5 and chamber 2 will relate to the drying temperature, so the temperature that triggers the alarm will then be higher. For example for aluminium oxide, the drying gas inlet temperature interval is between 300-500° C., while the drying gas inlet temperature interval for whole milk is 175-240° C. and for enzymes, the drying gas inlet temperature interval is 140-180° C. A relevant nozzle temperature that triggers the alarm will then be set accordingly. As an alternative it is the temperature difference between two areas within the drying chamber 2 that triggers the alarm. The monitoring may thus be carried out with respect to deposits of solid material, and the set value for the temperature is the temperature of the deposits. The operation of the spray dryer may be stopped when the alarm is triggered, and the deposits removed. This prevents excessive heating and the break-out of fire. Following the removal of the deposits and possibly further cleaning procedures, the operation of the spray dryer may be re-started.

Figure 2:
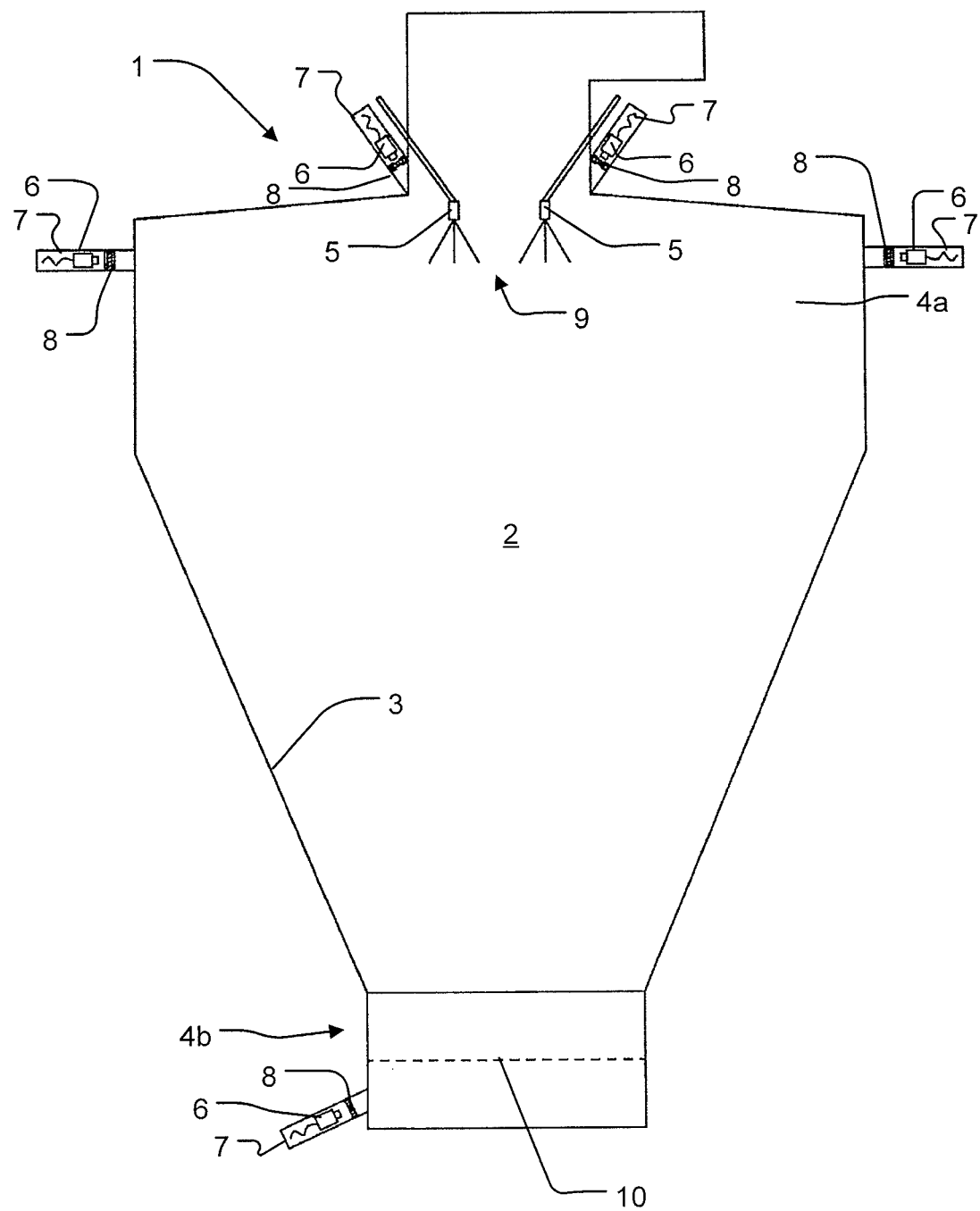

In FIG. 2 further features have been added to the features present in FIG. 1. Four more cameras, of which some may be IR cameras and others ordinary TV cameras, have been added. Two of the cameras are pointing at or have a free view of the nozzles 5. These cameras register if the temperature of the nozzles rises above an acceptable level as described in the above. Two additional cameras 6 have been mounted on each side of the drying chamber 2. This may be for monitoring the temperature of the wall 3 or for monitoring several nozzles 5 with one camera 6. Deposits may build up on the wall 3 of the spray dryer 1 as well, the predefined area to be monitored by these cameras being chosen according to for instance a programmed surveillance pattern. The cameras 6 on the side may be either IR cameras 6 or a mix of IR cameras 6 and ordinary TV cameras.

Instead of measuring when the temperature exceeds a certain level, the IR camera 6 or related circuitry may also detect if the temperature difference between the drying chamber 2 and the nozzles 5 exceed or move below a certain level. The cameras 6 on the side may detect the temperature on the walls of the drying chamber 2, thus indicating a normal operational temperature, or the temperature of potential deposits, while the cameras monitoring the nozzles 5 detect the temperature of the nozzles 5. The temperatures may then be compared in a computer, monitoring the whole process.

The IR camera mounted at the lower section 4 monitors the temperature below a fluid bed gas distributor plate 10 of the fluid bed. If the temperature in an area of the fluid bed gas distributor plate 10 rises above a certain level or the temperature difference becomes greater than a certain value, this may indicate that a lump of the material to be dried has fallen onto the fluid bed gas distributor plate 10 and the lump is too heavy to fluidise. This lump may ignite spontaneously if not detected and removed.

Temperature differences may be measured and/or monitored by one IR camera alone or be calculated based on input from several IR cameras.

In general the more nozzles 5 and greater area to monitor, the more IR cameras 6 are required.

Figure 3:
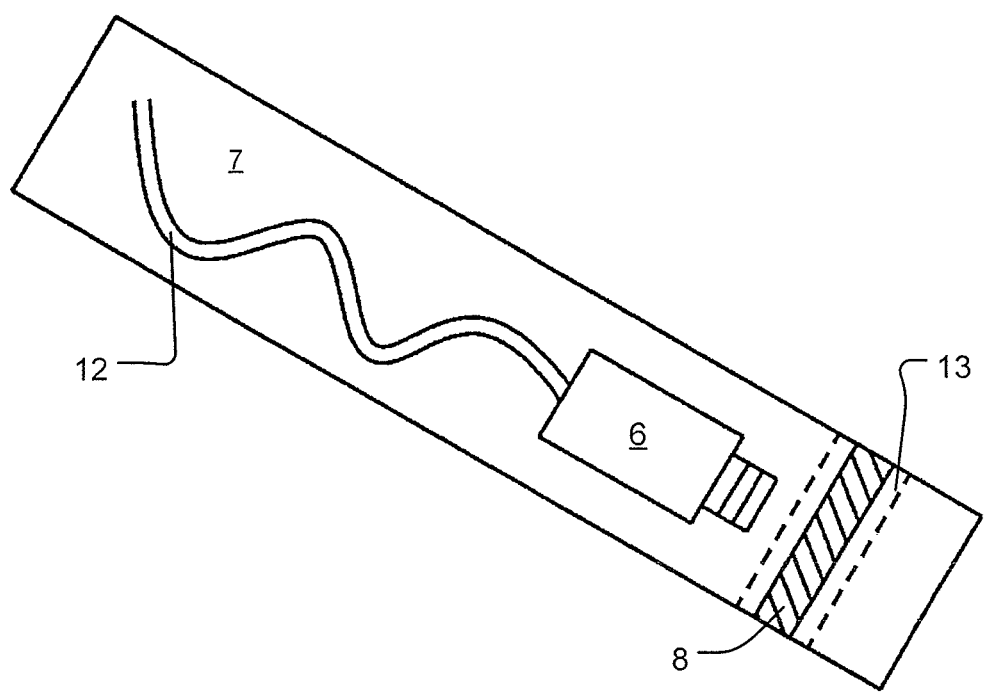

FIG. 3 is a close up view of the camera in a mounted position. A 19 M pixel IR-camera of a commercially available type may be used. The lance 7 is suitable for insertion into the drying chamber. The lance 7 furthermore contains the wiring and electronics 12 of the camera 6 and means for connecting the camera 6 with a monitoring station such as a computer. The lance 7 makes it easy to move, remove and replace cameras.

One or more cameras 6, e.g. an IR and a normal camera, may be mounted in one lance 7. The combination of an ordinary TV camera and an IR camera makes it possible to combine information from the process. Furthermore, other surveillance or monitoring means are conceivable, such as the use of fibre optics.

At the end of the lance 7 an inspection glass 8 is provided. A protective grid 13 is furthermore provided. It should be understood that by "glass" is meant a material suitable for IR-use as well as for safety demands for the product to be dried.

A cooling air may be supplied to the camera 6 due to the hot environment in which it is placed. The cooling air may be provided transversely to the camera's point of view. Further, the temperature of the camera 6 itself may be monitored as well.

The wiring and electronics 12 connects the IR camera 6 with matching software. The matching software easily makes it possible to define an area of the spray dying chamber 2 to monitor. The area may be displayed on a screen. This area may be increased or decreased at will. An average temperature may be displayed. An alarm function may be activated whenever the average temperature exceeds a set value for the specified area. Further, an operator at the screen may visualize the temperature at any point of the picture by simply moving the curser to the actual point he would like to view.

When referring to a camera there is meant at least one instance of a camera, which may both be an ordinary TV camera, an IR camera or a combination thereof.

The invention should not be regarded as being limited to the embodiment shown and described in the above but various modifications and combinations of features may be carried out without departing from the scope of the following claims.

The invention claimed is:

1. A method of monitoring a spray dryer part subject to the formation of deposits thereon during a spray drying process, the method of monitoring comprising:
   providing a spray drying chamber comprising the spray dryer part, the spray dryer part being at least a spray nozzle,
   associating one or more cameras with the spray drying chamber, the one or more cameras having a field of view inside the spray drying chamber, and at least one of the one or more cameras being an infrared camera,
   measuring a temperature of an outer surface of the spray nozzle with the infrared camera,
   providing a control system, and
   providing a set value for the temperature of the spray nozzle,
   wherein a drying gas having a drying gas temperature is fed into the spray drying chamber during the spray drying process,
   wherein an operating temperature of the spray nozzle relates to the drying gas temperature,
   wherein the set value for the temperature of the spray nozzle is higher than the operating temperature of the spray nozzle,
   wherein the outer surface of spray nozzle is exposed to the drying gas within the spray driving chamber,
   wherein the control system is associated with an alarm triggered when the temperature of the outer surface of the spray nozzle measured by the infrared camera exceeds the set value,
   wherein the measuring of the temperature of the outer surface of the spray nozzle includes measuring a temperature of deposits of solid material accumulated on the outer surface of the spray nozzle, and
   wherein the alarm is triggered as a result of the deposits forming on the outer surface of the spray nozzle during the spray drying process and the measured temperature of the deposits exceeding the set value for the spray nozzle.

2. The method according to claim 1, whereby at least two infrared cameras are associated with the spray drying chamber.

3. The method according to claim 1, the spray nozzle is an atomizing nozzle, and the measuring of the temperature of the spray dryer part comprises measuring the temperature of a part of the atomizing nozzle.

4. The method according to claim 1, further comprising monitoring a temperature of a portion of the wall of the spray drying chamber.

5. The method according to claim 1, further comprising monitoring a temperature of a portion of the fluid bed gas distributor plate.

6. The method according to claim 1, wherein the operation of the spray dryer is stopped when the alarm is triggered.

7. The method according to claim 6, further comprising removing the deposits after the spray dryer has been stopped.

8. The method according to claim 1, further comprising supplying a cooling gas to cool the infrared camera.

9. The method according to claim 1, wherein the infrared camera has a field of view of at least 90 degrees.

10. The method according to claim 1, wherein the infrared camera is positioned in the spray drying chamber via a movable and removable camera lance.

11. The method according to claim 9, wherein a visual camera and the infrared camera are combined together in one camera lance.

12. A spray dryer comprising:
    a spray drying chamber,
    atomizing means,
    an inlet for a drying gas,
    one or more cameras positioned in connection with the spray drying chamber, at least one of the one or more cameras being an infrared camera, and
    a control system connected to an alarm;
    wherein the infrared camera measures a temperature of deposits of solid material accumulated on a spray nozzle having an atomizing means
    wherein the spray dryer is configured to feed the drying gas having a drying gas temperature into the spray drying chamber during a spray drying process,
    wherein an operating temperature of an outer surface of the spray nozzle relates to the drying gas temperature,
    wherein the outer surface of spray nozzle is exposed to the drying gas within the spray drying chamber,
    wherein the control system is configured to activate the alarm when deposits form on the outer surface of the spray nozzle during the spray drying process and the temperature of the deposits on the spray nozzle is determined to have exceeded a set value for the spray dryer part, and
    wherein the set value for the temperature of the spray nozzle is higher than the operating temperature of the nozzle.

13. The spray dryer according to claim 12, wherein at least two infrared cameras are positioned in the spray drying chamber.

14. The spray dryer according to claim 12, wherein the infrared camera is positioned in the spray drying chamber via a movable and removable camera lance.

15. The spray dryer according to claim 14, wherein a visual camera and the infrared camera are combined together in one camera lance.

16. The spray dryer according to claim 12, wherein the infrared camera is covered by an inspection glass and a protective grid.

17. The spray dryer according to claim 12, wherein the infrared camera has a view of at least 90 degrees.

18. The spray dryer according to claim 12, wherein the atomizing means is a rotary atomizer.

19. A method of monitoring a spray dryer part subject to the formation of deposits thereon during a spray drying process, the method of monitoring comprising:

providing a spray drying chamber comprising the spray dryer part, the spray dryer part being at least a spray nozzle, associating one or more cameras with the spray drying chamber, the one or more cameras having a field of view inside the spray drying chamber, and at least one of the one or more cameras being an infrared camera, measuring a temperature of an outer surface of the spray nozzle with the infrared camera, providing a control system, and providing a set value for the temperature of the spray nozzle, wherein a drying gas having a drying gas temperature is fed into the spray drying chamber during the spray drying process, wherein the set value for the temperature of the spray nozzle is higher than the drying gas temperature, wherein the outer surface of spray nozzle is exposed to the drying gas within the spray drying chamber, wherein the control system is associated with an alarm triggered when the temperature of the outer surface of the spray nozzle measured by the infrared camera exceeds the set value, wherein the measuring of the temperature of the outer surface of the spray nozzle includes measuring a temperature of deposits of solid material accumulated on the outer surface of the spray nozzle, and wherein the alarm is triggered as a result of the deposits forming on the outer surface of the spray nozzle during the spray drying process and the measured temperature of the deposits exceeding the set value for the spray nozzle.

\* \* \* \* \*